US011734156B2

United States Patent
Bansal et al.

(10) Patent No.: US 11,734,156 B2
(45) Date of Patent: Aug. 22, 2023

(54) CRASH LOCALIZATION USING CRASH FRAME SEQUENCE LABELLING

(71) Applicant: Microsoft Technology Licensing, LLC, Redmond, WA (US)

(72) Inventors: Chetan Bansal, Seattle, WA (US); Manish Shetty Molahalli, Karnataka (IN); Suman Kumar Nath, Redmond, WA (US); Siamak Ahari, Seattle, WA (US); Haitao Wang, Sammamish, WA (US); Sean A. Bowles, Seattle, WA (US); Kamil Ozgur Arman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/483,571

(22) Filed: Sep. 23, 2021

(65) Prior Publication Data
US 2023/0091899 A1 Mar. 23, 2023

(51) Int. Cl.
G06F 11/36 (2006.01)
(52) U.S. Cl.
CPC ............... G06F 11/3636 (2013.01)
(58) Field of Classification Search
CPC .................................... G06F 11/3636
USPC ............... 717/124–141; 706/12–45
See application file for complete search history.

(56) References Cited

U.S. PATENT DOCUMENTS

| 7,356,430 | B2 * | 4/2008 | Miguelanez | G06F 11/273 702/108 |
| 8,005,916 | B2 * | 8/2011 | Pope | G06F 13/10 709/212 |
| 8,725,665 | B2 * | 5/2014 | Anderson | G06Q 10/04 714/37 |
| 8,725,666 | B2 * | 5/2014 | Lemmond | G06F 16/3344 706/13 |
| 8,775,341 | B1 * | 7/2014 | Commons | G06F 16/3344 706/20 |
| 9,443,192 | B1 * | 9/2016 | Cosic | G06N 5/048 |
| 10,042,695 | B1 * | 8/2018 | Karppanen | G06F 11/0706 |

(Continued)

OTHER PUBLICATIONS

Bianchi et al, "Reproducing Concurrency Failures from Crash Stacks", ACM, pp. 705-716 (Year: 2017).*

(Continued)

*Primary Examiner* — Anil Khatri
(74) *Attorney, Agent, or Firm* — Workman Nydegger (57) ABSTRACT

Machine-learned prediction of a blame frame of a crash stack. Specifically, a crash stack associated with a crash is parsed into a sequence of frames. The blame frame of the crash stack is estimated by, for each of a plurality of the sequence of frames, identifying a plurality of features of the corresponding frame, feeding the plurality of features to a neural network, and using the output of the neural network to make a prediction on whether the corresponding frame is a blame frame of the crash. If this is done during training time, the predicted blame frame can be compared against the actual blame frame, resulting in an adjustment of the neural network. Through appropriate featurization of the frames, and by use of the neural network, the prediction can be made cross-application and considering the context of the frame within the crash stack.

19 Claims, 6 Drawing Sheets

(56) References Cited

U.S. PATENT DOCUMENTS

| | | | | |
|---|---|---|---|---|
| 10,474,934 | B1* | 11/2019 | Cosic | G06T 7/70 |
| 10,599,957 | B2* | 3/2020 | Walters | G06N 3/04 |
| 10,949,329 | B2* | 3/2021 | Mathen | G06N 20/00 |
| 11,188,407 | B1* | 11/2021 | Swanson | G06F 11/1435 |
| 11,379,294 | B1* | 7/2022 | A | G06F 11/079 |
| 11,398,117 | B1* | 7/2022 | Slindee | G07C 5/0816 |
| 11,461,086 | B2* | 10/2022 | Livne | G06F 8/433 |
| 2013/0081000 | A1 | 3/2013 | Robinson | |
| 2015/0261596 | A1* | 9/2015 | Muthukumsarasamy | G06F 11/0778 714/57 |
| 2021/0173760 | A1 | 6/2021 | Downie et al. | |

OTHER PUBLICATIONS

Theisen et al, "Approximating Attack Surfaces with Stack Traces", IEEE, pp. 199-208 (Year: 2015).*

Wang et al, "Automatic Solution Summarization for Crash Bugs", IEEE, pp. 1286-1297 (Year: 2021).*

Chen et al, "STAR: Stack Trace Based Automatic Crash Reproduction via Symbolic Execution", IEEE, pp. 198-220 (Year: 2015).*

Seo et al, "Predicting Recurring Crash Stacks", ACM, pp. 180-189 (Year: 2012).*

Wandabwa et al, "Aspect of Blame in Tweets: A Deep Recurrent Neural Network Approach", ACM, pp. 1423-1424 (Year: 2017).*

Cui, et al., "RETracer: Triaging Crashes by Reverse Execution from Partial Memory Dumps", In Proceedings of International Conference on Software Engineering, May 14, 2016, pp. 820-831.

Glerum, et al., "Debugging in the (very) Large: Ten Years of Implementation and Experience", In Proceedings of the ACM SIGOPS 22nd Symposium on Operating Systems Principles, Oct. 11, 2009, 17 Pages.

Gu, et al., "Does the fault reside in a stack trace? Assisting crash localization by predicting crashing fault residence", In Journal of Systems and Software, Feb. 2019, pp. 88-104.

Karpathy, et al., "Large-Scale Video Classification with Convolutional Neural Networks", In Proceedings of IEEE Conference on Computer Vision and Pattern Recognition, Jun. 23, 2014, pp. 1725-1732.

Li, et al., "Visualizing and Understanding Neural Models in NLP", In Proceedings of NAACL-HLT 2, Jun. 12, 2016, pp. 681-691.

Marshall, et al., "Using the !analyze Extension", Retrieved from: https://docs.microsoft.com/en-us/windows-hardware/drivers/debugger/using-the—analyze-extension, May 23, 2017, 11 Pages.

Vasiliev, et al., "TraceSim: a method for calculating stack trace similarity", In Proceedings of the 4th ACM SIGSOFT International Workshop on Machine-Learning Techniques for Software-Quality Evaluation, Nov. 2020, pp. 25-30.

Wu, et al., "CrashLocator: locating crashing faults based on crash stacks", In Proceedings of the 2014 International Symposium on Software Testing and Analysis, Jul. 2014, pp. 204-214.

"International Search Report and Written Opinion Issued in PCT Application No. PCT/US22/041433", dated Dec. 5, 2022, 16 Pages.

* cited by examiner

CRASH LOCALIZATION USING CRASH FRAME SEQUENCE LABELLING

BACKGROUND

In computing, a "crash" is an event in which software stops functioning properly and exits. It is important to be able to evaluate the crash so that the functionality of the software can be corrected. This is referred to as "debugging" the software. When a crash occurs, the system creates a "crash stack". A crash stack typically identifies the methods that were executing during the crash, and potentially other valuable information such as executed binaries and code locations that can hint as to what might have caused the crash. As an example, a crash stack contains a sequence of stack frames. A stack frame is a frame of data that gets pushed onto the stack. In the case of a call stack, a stack frame would represent a function call with the associated arguments.

An important step in investigating a crash is called "crash localization". Crash localization endeavors to identify the method that that contains, or is closest to, the crash location. Crash localization helps a debugging tool and/or programmer to find an appropriate beginning point for evaluating the code to find and correct the true error. Furthermore, when performed over a large collection of crash stacks associated with a wide variety of crashes, crash localization helps prioritize the debugging process, as attention can be placed on areas of the code that are most frequently causing crashes.

Despite best efforts, due to the increasing complexity and capabilities of software, released software can contain bugs that cause software to crash in the field. Large software companies use error reporting systems in order to automate (with user permission) the collection of crash stacks that occur when their software runs in the field. Some of these error reporting systems are large scale, collecting perhaps millions of crash reports and associated crash stacks per day. Many of such error reporting systems also perform crash localization to facilitate debugging.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Conventional error reporting systems gather crash stacks from a large number of applications and platforms, and in which the crash stacks are caused by crashes having diverse root causes. Such error reporting systems perform crash localization by applying rules and heuristics. Some of these rules and heuristics can be applied across applications and platforms. However, some are specific to an application and platform. As new applications are introduced, and existing applications are run in new environments, it is challenging to keep the rules and heuristics up to date.

In accordance with the principles described herein, crash-localization logic is automatically formulated in a data-driven manner using the large collection of crash stacks available to the error reporting system. Thus, rules and heuristics do not need to be updated as new applications and environments are introduced. The error reporting system in accordance with the principles described herein can instead learn how to perform crash localization using its available crash frames. The crash localization can thus be more agile and quick to perform accurate crash localization for new software and environments.

In accordance with the principles described herein, a blame frame of a crash stack is estimated using machine learning. Specifically, a crash stack associated with a crash is parsed into a sequence of frames. The blame frame of the crash stack is estimated by, for each of a plurality of the sequence of frames, identifying a plurality of features of the corresponding frame, feeding the plurality of features to a neural network, and using the output of the neural network to make a prediction on whether the corresponding frame is a blame frame of the crash. If this is done during training time, the predicted blame frame can be compared against the actual blame frame, resulting in an adjustment of the neural network. Through appropriate featurization of the frames, and by use of the neural network, the prediction can be made cross-application and considering the context of the frame within the crash stack.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Conventional error reporting systems gather crash stacks from a large number of applications and platforms, and in which the crash stacks are caused by crashes having diverse root causes. Such error reporting systems perform crash localization by applying rules and heuristics. Some of these rules and heuristics can be applied across applications and platforms. However, some are specific to an application and platform. As new applications are introduced, and existing applications are run in new environments, it is challenging to keep the rules and heuristics up to date.

In accordance with the principles described herein, crash-localization logic is automatically formulated in a data-driven manner using the large collection of crash stacks available to the error reporting system. Thus, rules and heuristics do not need to be updated as new applications and environments are introduced. The error reporting system in accordance with the principles described herein can instead learn how to perform crash localization using its available crash frames. The crash localization can thus be more agile and quick to perform accurate crash localization for new software and environments.

In accordance with the principles described herein, a blame frame of a crash stack is estimated using machine learning. Specifically, a crash stack associated with a crash is parsed into a sequence of frames. The blame frame of the crash stack is estimated by, for each of a plurality of the sequence of frames, identifying a plurality of features of the corresponding frame, feeding the plurality of features to a neural network (such as a recurrent neural network), and using the output of the neural network to make a prediction on whether the corresponding frame is a blame frame of the crash. If this is done during training time, the predicted blame frame can be compared against the actual blame frame, resulting in an adjustment of the neural network. Through appropriate featurization of the frames, and by use of the neural network, the prediction can be made cross-application and considering the context of the frame within the crash stack.

Figure 1:
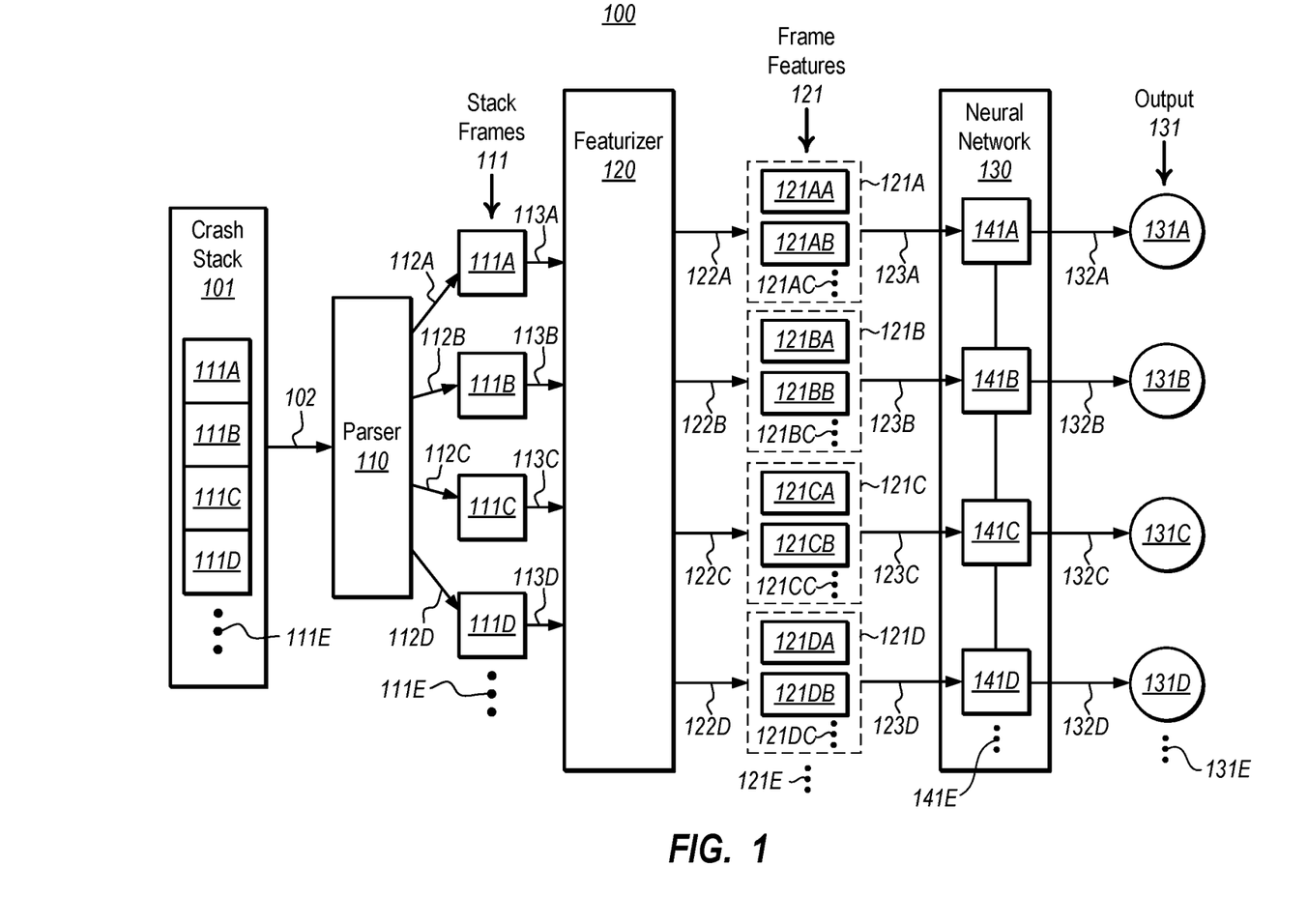
FIG. 1 illustrates an environment in which the principles described herein may be employed in order to estimate a blame frame of a crash stack, or generate hidden data that can then be used to estimate a blame frame of a crash stack, in accordance with the principles described herein.

FIG. 1 illustrates an environment 100 in which the principles described herein may be employed in order to estimate a blame frame of a crash stack, or to generate hidden data that can then be used to estimate a blame frame of a crash stack. A "blame frame" is a portion of the crash stack that identifies a computer-executable entity (such as a method) that contains, or is closest to, the crash location. FIG. 1 shows the flow from the accessing of the crash stack 101 all the way until the production of output 131 from a recurrent neural network. While this output 131 may be considered a rough estimate of the blame frame of the crash, it may also be considered as hidden data that is used for more processing to obtain more refined estimation of the blame frame.

Figure 2:
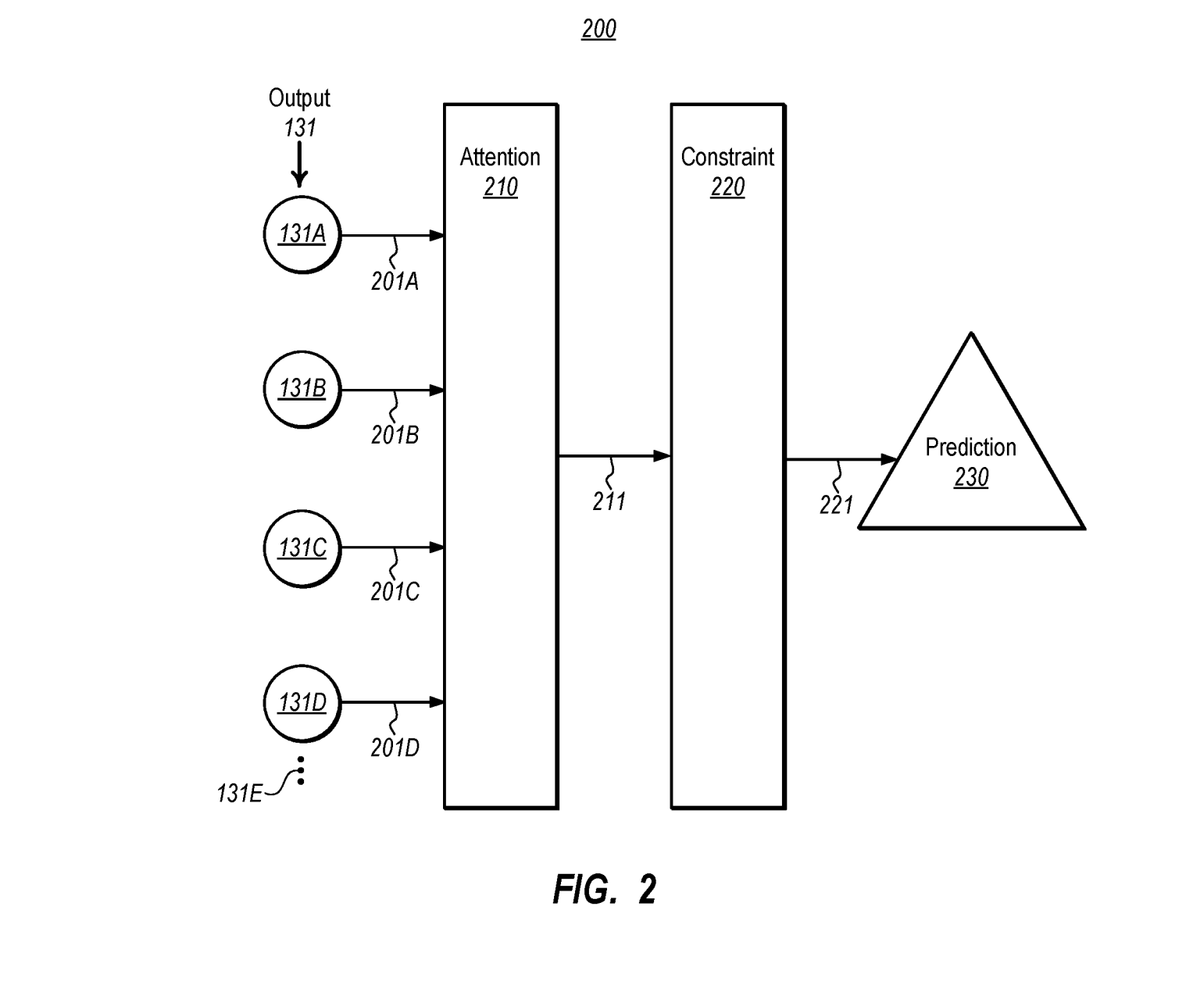
FIG. 2 illustrates an environment in which such hidden data output is applied to an attention component and a constraint component, in accordance with the principles described herein.

For example, FIG. 2 illustrates an environment 200 in which such output 131 is applied to an attention component 210 and a constraint component 220. The attention component 210 provides for better consideration of long-range dependencies between frames and for more focus on the most likely candidates for the blame frame. The constraint component 220 is used to apply constraints to the estimation—such as the constraint that only one of the frames should be estimated as being the blame frame.

Figure 3:
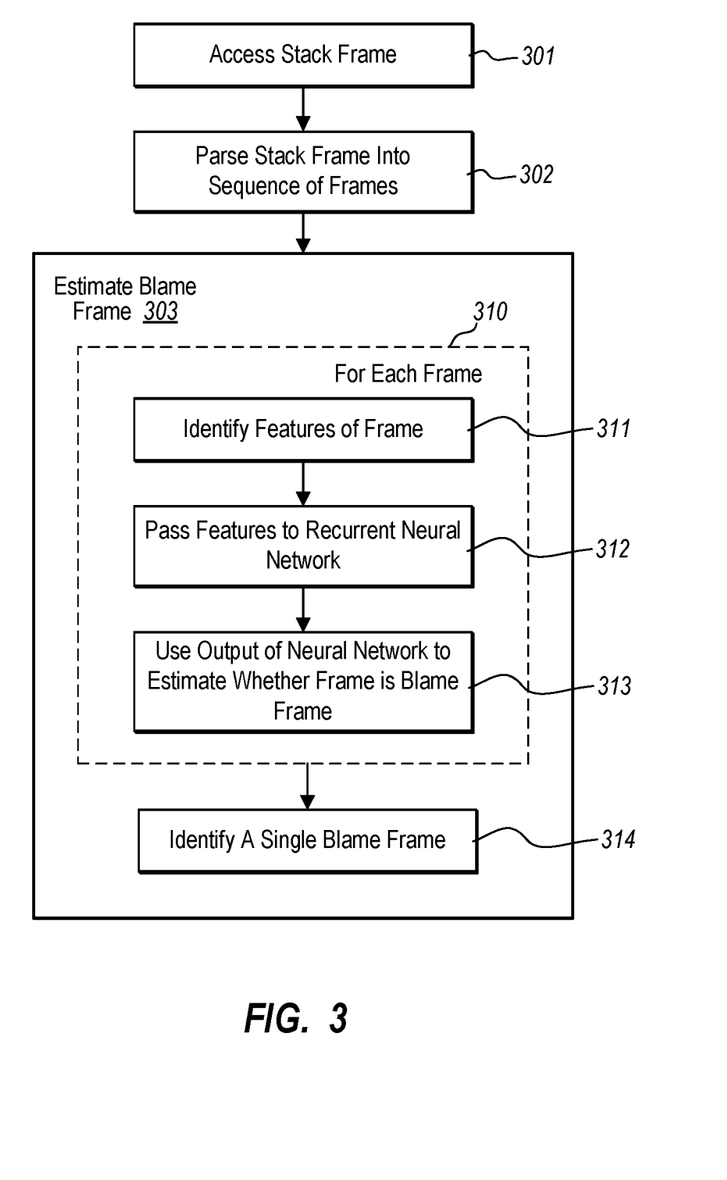
FIG. 3 illustrates a flowchart of a method performed by a computing system to estimate a blame frame of a crash stack, in accordance with the principles described herein.

FIG. 3 illustrates a flowchart of a method 300 performed by a computing system to estimate a blame frame of a crash stack. As the method 300 of FIG. 3 may be performed within the environment 100 of FIG. 1, and potentially also the environment 200 of FIG. 2, The method 300 of FIG. 3 and the environment 100 of FIG. 1 and the environment 200 of FIG. 2 will be described with frequent reference to each other.

The flow illustrated within the environment 100 begins with a crash stack 101. The crash stack 101 includes multiple sequential stack frames 111A through 111D. Although four stack frames 111A through 111D are illustrated within the crash stack 101, the ellipsis 111E represents that a crash stack 101 may include any number of stack frames. A stack frame is a frame of data that gets pushed onto the stack. In the case of a call stack, a stack frame would represent a function call with the associated arguments. Accordingly, the number of stack frames within a crash stack depends on the context of execution when the crash occurred, as well as the level of detail recorded within a frame by the runtime. Theoretically, there may be but a single stack frame in the crash stack if the crash occurred in the main program without any functions being called. However, crash stacks can also have more than a hundred stack frames when the crash occurs in more complex execution. Stack frames are also referred to simply as "frames" herein. The frames 111A through 111E may collectively also be referred to simply as "frames 111" herein.

In the method 300, the crash frame is accessed (act 301). In the example environment 100 of FIG. 1, the parser component 110 accesses (as represented by arrow 102) a crash stack 101 that includes the sequential frames 111A through 111D. The parser component 110 may be structured as described below for the executable component 606 of the computing system 600 FIG. 6.

Referring again to the method 300 of FIG. 3, the accessed crash frame is then parsed into its constituent sequential frames (act 302). In the example environment 100 of FIG. 1, the parser component 110 parses the stack frames 111 from the crash stack 101. For instance, the first frame 111A, the second frame 111B, the third frame 111C and the fourth frame 111D are output (as represented by respective arrows 112A through 112D. If there were more frames (as represented by the ellipsis 111E), then those additional frames would be parsed out as well. The sequential ordering of the frames is preserved in the output of the parser component 110. Mechanisms for parsing a crash stack into its constituent sequence of frames are known in the art, and thus will not be detailed here.

Referring back to the method 300, a blame frame of the crash stack is then estimated using the sequence of frames (act 310). This involves performing the content of the dashed-lined box 310 for each of the frames in the sequence of frames of the crash stack. In particular, features of the corresponding frame are identified (act 311). Those features are then fed to a neural network (act 312). The output of the neural network is then used to make a prediction on whether the corresponding frame is a blame frame of the crash (act 313). An embodiment of each of the acts 311 through 313 will now be described in more detail by way of the example environment 100 of FIG. 1.

First, features of each respective frame are identified (act 311). Referring to FIG. 1, the featurizer component 120 accesses (as represented by 113A) the frame 111A and identifies (as represented by arrow 122A) multiple features 121A of the frame 111A. Similarly, the featurizer component 120 accesses (as represented by arrow 113B) the frame 111B and identifies (as represented by arrow 122B) multiple features 121B of the frame 111B, accesses (as represented by arrow 113C) the frame 111C and identifies (as represented by arrow 122C) multiple features 121C of the frame 111C, and accesses (as represented by arrow 113D) the frame 111D and identifies (as represented by arrow 122D) multiple features 121D of the frame 111D. The ellipsis 121E represents that the featurizer component may generate features for other frames (as represented by the ellipsis 111E) as well if included within sequence of frames. The featurizer component 120 may be structured as described below for the executable component 606 of the computing system 600 FIG. 6.

To accurately summarize a crash stack, embodiments described herein use the features that capture both semantic and domain-specific information, and that the inventors have discovered are strongly correlated to crash locations. Furthermore, to allow the estimation to be made on crash stacks regardless of the binary (the application, operating system, or component) that resulted in the crash or that were running at the time of the crash, the embodiment uses features that are more generic in that they apply to crashes across applications.

The semantic features represent the important contents of a frame such as a namespace and method name. To consider the global semantics and relevance of a function in a frame, the embodiment uses a simple Term Frequency—Inverse Document Frequency (Tf-Idf) vectorization method. With this approach, a weighted list of important tokens is automatically extracted from namespaces and methods within frames. More concretely, the semantic features could include an n-dimensional (where "n" is a whole number that is potentially large) Tf-Idf vector of a namespace of the frame, and/or an n-dimensional Tf-Idf vector of a method of the frame. In the illustrated case of FIG. 1, the features 121AA subset of the features 121A may be semantic features of the first frame 111A. Continuing, the feature subsets 121BA, 121CA and 121DA may be semantic features of their respective frames 111B, 111C and 111D.

Other features could be related to a type of code (also called herein "code type features"). Such features can be strongly correlated to a crash. As an example, code from applications are more likely to have bugs than core operating system user-mode code. To capture such information, some embodiments use features that check the presence of the application's name within the frame (i.e., the binary name). Furthermore, the features that represent kernel code, core operating system modules, and exceptions can be extracted. These features can help models de-prioritize frames that are less likely to contain the root cause of the crash. Examples of such code type features include whether the frame contains the application's name, whether the frame is the first frame within the application's name, whether the frame identifies kernel code, whether the code identifies other core operating system code, whether the frame identifies an execution exception, and so forth. In the illustrated case of FIG. 1, the features 121AB subset of the features 121A may be code type features of the first frame 111A. Continuing, the feature subsets 121BB, 121CB and 121DB may code type features of their respective frames 111B, 111C and 111D.

As represented by the ellipsis 121AC through 121DC of FIG. 1, the featurizer component may generate other types of features as well for the respective frames 111A through 111D in the sequence of frames. As an example, frames at the top of crash stacks are more likely to be blamed. Thus, the normalized position of the frame within the crash stack is a feature that could be extracted. Also, at times, frames can be incomplete or have missing symbols in scenarios in some third-party software or operating systems or libraries. To de-prioritize such frames, the features could include whether the method is unknown, whether the method is empty, whether the binary is unknown, or whether the entire frame is empty.

Thus, referring to FIG. 3, an example of the identification of the features (act 311) has been described. Note again that many of the features are relevant to crashes across a wide variety of applications. After the features are identified, the features are passed to a neural network (act 312). In FIG. 1, for example, the features 121A of the first frame 111A are fed (as represented by arrow 123A) to a neural network 130. Likewise, the features 121B, 121C and 121D are fed to the neural network, as represented by respective arrows 123B, 123C and 123D.

In the illustrated case of FIG. 1, the neural network is a recurrent neural network having multiple stages, and the features for each of the frames are fed to a respective stage a recurrent neural network. For example, the neural network 130 is in this example a recurrent neural network that includes multiple stages 141A through 141D. The first stage 141A receives (as represented by arrow 123A) the features 121A of the first frame 111A, the second stage 141B receives (as represented by arrow 123B) the features 121B of the second frame 111B, the third stage 141C receives (as represented by arrow 123C) the features 121C of the third frame 111C, and the fourth stage 141D receives (as represented by arrow 123D) the features 121D of the fourth frame 111D. The neural network could be other types of neural networks as well, such as a convolutional network, transformer network, and so forth.

Whether a particular frame is blamed or not often depends on its context, such as the state of frames above or below the particular frame. In the neural network 130, state 131A of the first frame is output as represented by arrow 132A. However, some state is fed (as represented by line 142A) to the subsequent second stage to generate state 131B of the second frame as represented by the arrow 132B. Again, some of that state is fed (as represented by line 142B) to the third stage to generate state 131C of the third frame as represented by arrow 132C. However, some of that state is fed (as represented by line 142C) to the fourth stage to generated state 131D of the fourth frame. Accordingly, in that scenario, the state of frames above the particular frame in the stack frame can impact the prediction of the blame frame state of the particular frame.

A particular type of neural network that allows for effective consideration of context from surrounding frames is a long short-term memory (LSTM) network. Thus, the neural network 130 of FIG. 1 may, as an example, be an LSTM network. However, to allow for consideration of the state of frames from below the particular frame in a stack frame to also be considered, the recurrent neural network 130 may (as an example) be a bidirectional long short-term memory (BiLSTM) network. This allows for the context of particularly close neighbors of the particular frame to be considered when predicting whether a frame is a blame frame.

LSTM networks are a type of recurrent neural network that have been widely used to process sequential data in tasks such as language modelling, speech processing and code comment generation. It takes a sequence of inputs and returns a sequence of vectors that encodes information at every stage (here, at every frame). A particular frame will receive context from other frames that occur on either side using a BiLSTM.

Returning to FIG. 3, the output of the neural network is used to estimate whether each frame is a blame frame (act 313). In the example environment 100 of FIG. 1, the output 131 of the neural network 130 could be a rough prediction of whether the associated frame is a blame frame. However, there is an opportunity to use the output 131 as hidden state to formulate a better prediction of a blame frame. This hidden state could include a concatenation of context coming from each side of the frame. FIG. 2 illustrates an environment 200 in which the output 131 from the neural network 130 of FIG. 1 is hidden state that is further processed by an attention component 210 and a constraint component 220. Each component may be structured as described below for the executable component 606 of the computing system 600 FIG. 6.

While a BiLSTM network can model sequential context flow, actual dependencies between frames can be widely distributed in the crash stack. Also, crash stacks can be very long (even hundreds of frames long), and BiLSTM networks can sometimes fail to handle non-neighboring or even long-range dependencies between remotely positioned frames in the crash stack. To overcome these challenges, the environment 200 includes an attention component 210 that accesses the hidden state 131. As an example, the attention component 210 accesses the hidden state 131A through 131D of the first through fourth frames of the stack frame (stack frame 101 of FIG. 1), as represented by respective arrows 201A through 201D. Furthermore, the ellipsis 131E represents that if there was further hidden state for yet other frames in the sequence, the attention component 210 could access that as well. The attention component 210 may also emphasize or focus on frames that are more likely to be the cause of the crash.

In some embodiments, the attention component 210 is implemented at a frame level with a learnable parameter $W_a$ as described in Equations 1 to 3 below.

$$\text{scores} = W_a^T h \tag{1}$$

$$\alpha = \text{softmax}(\text{scores}) \tag{2}$$

$$h^* = \tanh(h\alpha^T) \tag{3}$$

The attention component 210 takes as input the hidden states $h = [h_1, h_2, \ldots, h_T]$ from the BiLSTM network, and generates a weighted context vector $h^*$ of the stack. This weighting mechanism urges the model to focus on sections of the stack that are more likely to have crash locations. Referring to FIG. 2, the weighted context vectors are provided (as represented by arrow 211) to a constraint component 220. This output is a neural representation of frame encodings.

Next, referring to FIG. 3, a single frame is labelled as the blame frame (act 314). Here, we could simply predict labels independently for each frame. But this disregards some structural constraints in the problem of finding the blame frame in a crash stack. Unlike sequence labelling for natural language, there is a constraint where only one frame in the crash stack is to be labelled as a blame frame. The constraint component 220 applies such structural constraints. Conditional Random Fields (CRF) can be used to learn such structural constraints, and is a discriminative classifier that models decision boundaries between labels in a sequence.

To enforce such restrictions, in one embodiment, the constraint component 220 is modeled as a frame level labelling task jointly using linear chain conditional random fields. Given an input sequence X, the constraint component computes the probability of observing an output label sequence y, or in other words p(y|X) in accordance with Equations 4 and 5 below.

$$s(X, y) = \sum_{k=0}^{n} A_{y_i, y_{i+1}} + \sum_{k=0}^{n} P_{i, y_i} \tag{4}$$

$$p(y|X) = \frac{e^{s(X,y)}}{\sum_{y' \in Y} e^{s(X,y')}} \tag{5}$$

Here, P is a probability matrix of the shape n×k from the attention layer, where k is the number of distinct tags and n is the sequence length. A represents the matrix of scores for transitions between output labels. Finally, to extract labels, the layer predicts the output sequence with the highest probability. With this approach, the model learns to include structural validity in predicting output sequences. Referring to FIG. 2, the constraint component 220 outputs (as represented by arrow 221) the blame frame prediction 230 in which only one of the frames is labelled as the blame frame.

Figure 4:
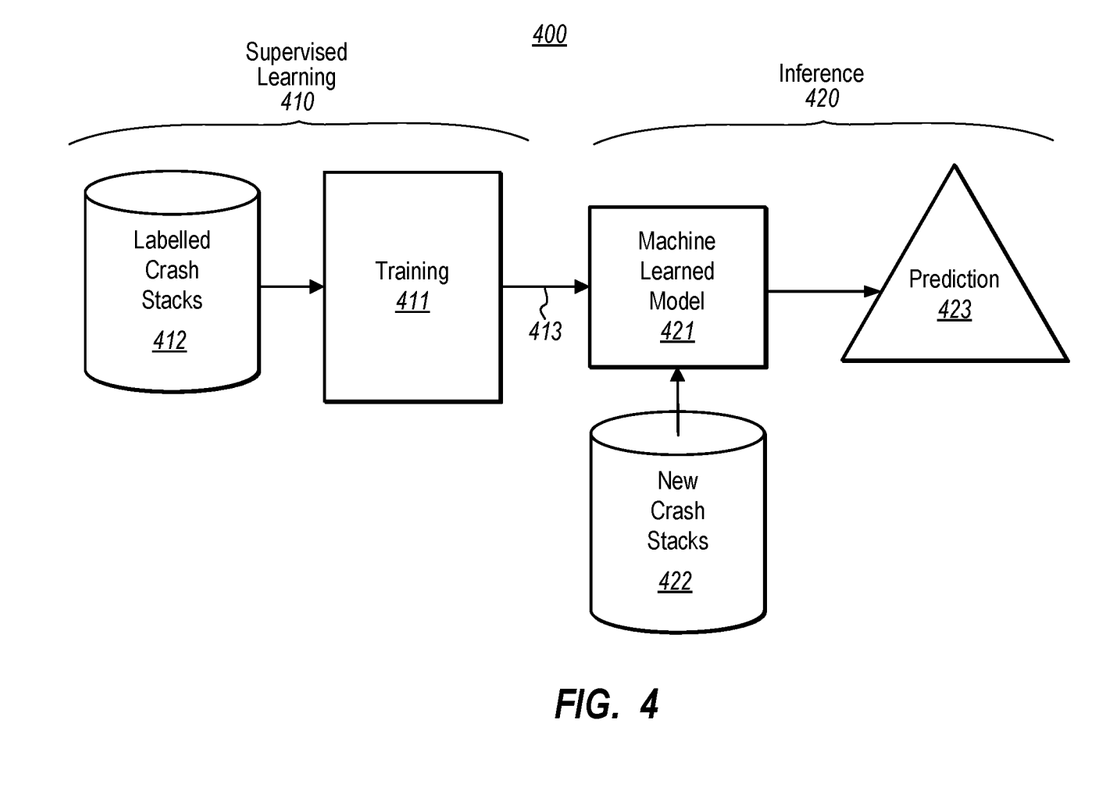
FIG. 4 illustrates a flow included two phases involved with the machine learning described herein; namely, a supervised learning phase, followed by an inference phase.

FIG. 4 illustrates a flow including two phases involved with the machine learning described herein; namely, a supervised learning phase 410, followed by an inference phase 420. In the supervised learning phase 410, a training component 411 trains a model on labelled crash stacks 401 to generate (as represented by arrow 413) a machine-learned model 421. In the inference phase 420, the machine-learned model 421 is actually applied to make blame frame predictions 423 on crash stacks where the blame frames have not been previously labelled. The principles described herein may be employed at either or both of the learning phase or the inference phase.

If performed at the learning phase 410, the training component 411 would make a prediction of the blame frame of each of the labelled crash stacks 412 using the structure and methodology described herein. The predicted blame frame would the be compared to the actual blame frame as labelled in the training set of labelled crash stacks 412. Based on the comparison, the recurrent neural network would be adjusted by adjusting the various weights and biases. If this is performed over a large number of crash stacks involving a large variety of applications, the machine-learned model would be trained to perform blame frame predictions across a variety of applications. At the inference phase, 420, the now machine-learned model 421 would then operate upon new crash stacks 422 after they arose to make predictions for the blame frame of those new crash stacks. Conventional error reporting systems include such large collections of crash stacks for crashes that occurred after software is deployed.

Multi-Task Learning (MTL) is an approach to improve generalization in modes using the inductive bias in jointly learnable related tasks. In the context of classification and sequence labelling, multi-task learning improves performance of individual tasks by learning multiple tasks simultaneously. In the embodiments described above, the primary task is finding or estimating a blame frame of a crash stack. This task is often termed as "crash localization". However, localizing crashes not only depends on frames, but also on the class of problems that might have caused the crash. Consequently, problem class prediction is another task that may be performed for a multi-task model.

Figure 5:
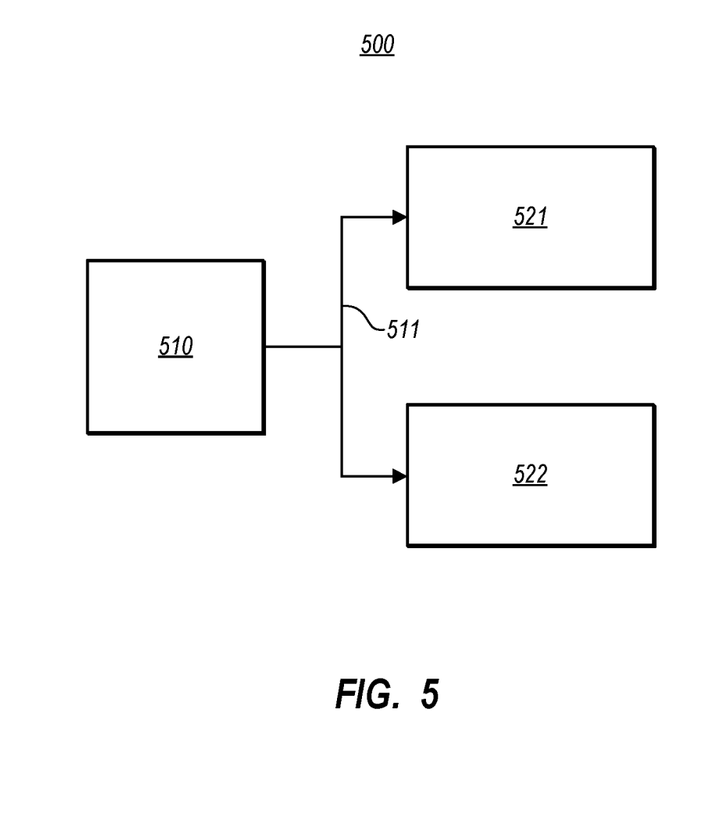
FIG. 5 illustrates a multi-task environment in which an initial stage is shared amongst all tasks, and thereafter processing is split to be performed on a per task basis.

FIG. 5 illustrates a multi-task environment 500. Here, a component 510 is used to generate hidden state 511 constituting inductive biases relevant to both crash localization and problem classification. This component 510 may be the environment 100 of FIG. 1. Then, the environment 500 splits into two task specific branches including a blame frame prediction branch 521 and a problem class prediction branch 522.

Each of the branches 521 and 522 may be structured as described for the environment 200 of FIG. 2. However, the attention component of the branch 521 will be designed to identify long-range dependencies and focus on frames relevant to predicting the blame frame. Likewise, the constraint component of the branch 521 will be designed to impose constraints suitable for blame frame prediction. On the other hand, the attention component of the branch 522 will be designed to identify long-range dependencies and focus on frames relevant to predicting the problem class of the crash. Likewise, the constraint component of the branch 522 will be designed to impose constraints suitable for problem class prediction.

The data-driven machine learning and prediction of blame frames allows the model to effectively adapt as software evolves. Software constantly evolves as new applications, APIs, and programming languages are introduced and become popular. Handling crashes in such new cases usually requires a lot of time and deep domain knowledge to write custom rules and plugins for existing heuristic and rules-driven approaches for making blame frame predictions. Here, learning a model instead can help address the scalability and generalizability challenges with ever growing and evolving software.

But even with supervised machine learning, for a new application, it is not trivial to develop accurate crash localization modules, as there would be minimal labelled training data. However, in crashes, there are many patterns to be learnt that are common across applications; especially the large portion of frames that represent the underlying system. This implies that models trained on crashes from a global set of applications can be used to localize crashes for new and disjoint sets.

A transfer learning and fine tuning approach can be used to quickly adapt the model as software grows and evolves. Transfer learning involves the use of previously acquired biases and weights of a model being transferred as the starting point for new learning. Thus, the model is pre-trained on a large dataset of crashes spanning multiple applications. This model learns general and common information about crashes. Then, for a new application scenario, the fine tuning of the model can be performed with low amounts of training data for crashes from the new application. This allows the model to adapt quickly and effectively to new and evolving software, without requiring accumulation of large amounts of training data.

Accordingly, an efficient mechanism to make data-driven predictions of blame frames in crash stacks has been described. Because the principles described herein are performed in the context of a computing system, some introductory discussion of a computing system will be described with respect to FIG. 6. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
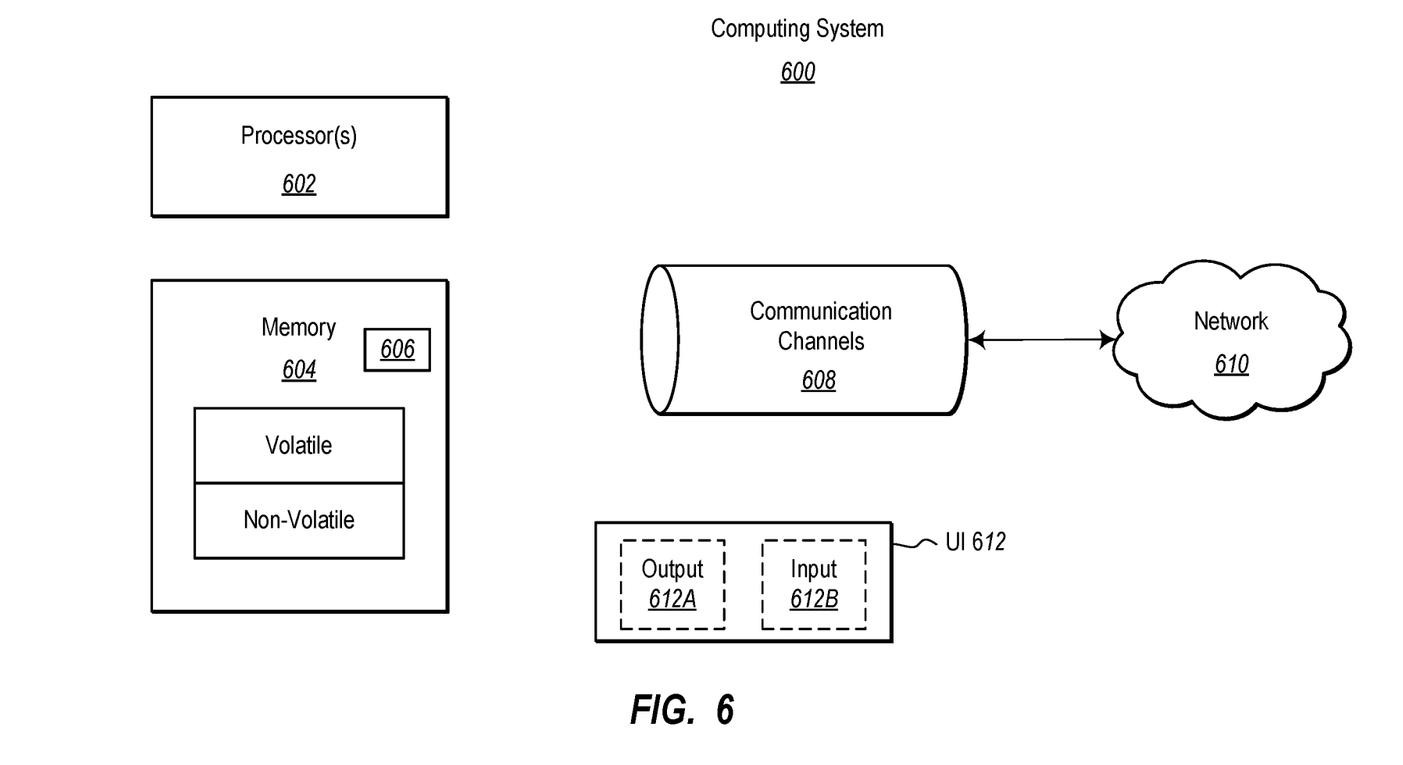
FIG. 6 illustrates an example computing system in which the principles described herein may be employed.

As illustrated in FIG. 6, in its most basic configuration, a computing system 600 includes at least one hardware processing unit 602 and memory 604. The processing unit 602 includes a general-purpose processor. Although not required, the processing unit 602 may also include a field programmable gate array (FPGA), an application specific integrated circuit (ASIC), or any other specialized circuit. In one embodiment, the memory 604 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 600 also has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, virtual or augmented reality, holograms and so forth. Examples of input mechanisms 612B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
one or more processors; and
one or more computer-readable storage devices having thereon computer-executable instructions that are structured such that, if executed by the one or more processors, would cause the computing system to estimate a blame frame of a crash stack by performing the following:
parsing a crash stack associated with a crash into a sequence of frames; and
estimating a blame frame of the crash stack by, for each of a plurality of the sequence of frames, performing the following:
identifying a plurality of features of the corresponding frame;
feeding the plurality of features to a neural network;
using the model to obtain an output comprising (i) a rough estimate of an initial prediction of frames for selecting the blame frame and (ii) hidden data that affects attention applied by the neural network for selecting the blame frame from the initial prediction of frames; and
using the output of the neural network to make a prediction on whether the corresponding frame is the blame frame of the crash;
the computer-executable instructions being further structured such that estimation of the blame frame of a crash stack is performed during inference time using a previously trained neural network.

2. The computing system in accordance with claim 1, the computer-executable instructions being further structured such that estimation of the blame frame is performed such that only one of the sequence of frames is estimated as the blame frame of the crash.

3. The computing system in accordance with claim 1, the computer-executable instructions being further structured such that a conditional random fields (CRF) component is used to constrain the predictions such that only one of the sequence of frames is estimated to be the blame frame of the crash.

4. The computing system in accordance with claim 1, the computer-executable instructions being further structured such that the feeding of the plurality of features to a neural network comprises feeding the plurality of features for each of the plurality of frames to a respective stage of a plurality of stages of the neural network.

5. The computing system in accordance with claim 1, the computer-executable instructions being further structured such that estimation of the blame frame of a crash stack is performed during supervised learning, the computer-executable instructions being further structured such that, if the computer-executable instructions were executed, the computing system would further:
compare the predicted blame frame against an actual blame frame; and
based on the comparison, adjust the neural network.

6. The computing system in accordance with claim 5, the computer-executable instructions being further structured such that the supervised learning begins with a neural network that was trained on crash stacks resulting from crashes spanning a plurality of applications, the supervised learning being performed on crash stacks resulting from crashes involving at least some applications that are not included within the plurality of applications.

7. The computing system in accordance with claim 1, the neural network being a long short-term memory (LSTM) network.

8. The computing system in accordance with claim 1, the neural network being a bidirectional long short-term memory (BiLSTM) network.

9. The computing system in accordance with claim 1, a particular feature of the plurality of features of a particular frame of the sequence of frames including a semantic feature of the particular frame.

10. The computing system in accordance with claim 9, the particular feature being a vector of a method or namespace of the particular frame.

11. The computing system in accordance with claim 1, a particular feature of the plurality of features of a particular frame of the sequence of frames including a type of code referenced in the particular frame.

12. The computing system in accordance with claim 1, a particular feature of the plurality of features of a particular frame of the sequence of frames including a position of the particular frame in the sequence of frames.

13. The computing system in accordance with claim 1, the computer-executable instructions being further structured such that using the output of the neural network to make a prediction on whether the corresponding frame is a blame frame of the crash comprises:
using an attention component to identify at least one dependency between non-neighboring frames in the sequence of frames.

14. The computing system in accordance with claim 1, the computer-executable instructions being further structured such that, if executed by the computing system, the computer-executable instructions would cause the computing system to further perform the following:
using the output of the neural network to make a prediction of a problem class of the crash.

15. A computer-executed method for estimating a blame frame of a crash stack, the method comprising:
parsing a crash stack associated with a crash into a sequence of frames; and
estimating a blame frame of the crash stack by, for each of a plurality of the sequence of frames, performing the following:
identifying a plurality of features of the corresponding frame;
feeding the plurality of features to a neural network;
using the model to obtain an output comprising (i) a rough estimate of an initial prediction of frames for selecting the blame frame and (ii) hidden data that affects attention applied by the neural network for selecting the blame frame from the initial prediction of frames; and using the output of the neural network to make a prediction on whether the corresponding frame is the blame frame of the crash;

the computer-executable instructions being further structured such that estimation of the blame frame of a crash stack is performed during inference time using a previously trained neural network.

16. The computer-executed method in accordance with claim 15, the feeding of the plurality of features to a neural network comprising feeding the plurality of features for each of the plurality of frames to a respective stage of a plurality of stages of the neural network.

17. The computer-executed method in accordance with claim 15, further comprising:

using the output of the neural network to make a prediction of a problem class of the crash.

18. The computer-executed method in accordance with claim 15, the method being performed on multiple crash stacks to make a prediction of the blame frame for each of the multiple crash stacks.

19. A computer program product comprising one or more computer-readable hardware storage devices having thereon computer-executable instructions that are structured such that, if executed by one or more processors of a computing system, would cause the computing system to perform a method for estimating a blame frame of a crash stack, the method comprising:

parsing a crash stack associated with a crash into a sequence of frames; and estimating a blame frame of the crash stack by, for each of a plurality of the sequence of frames, performing the following:

identifying a plurality of features of the corresponding frame;

feeding the plurality of features to a neural network;

using the model to obtain an output comprising (i) a rough estimate of an initial prediction of frames for selecting the blame frame and (ii) hidden data that affects attention applied by the neural network for selecting the blame frame from the initial prediction of frames; and using the output of the neural network to make a prediction on whether the corresponding frame is the blame frame of the crash;

the computer-executable instructions being further structured such that estimation of the blame frame of a crash stack is performed during inference time using a previously trained neural network.

* * * * *